United States Patent
Lavi

(10) Patent No.: US 11,893,381 B1
(45) Date of Patent: Feb. 6, 2024

(54) DIGITAL PROCESSING SYSTEMS AND METHODS FOR REDUCING FILE BUNDLE SIZES

(71) Applicant: Monday.com LTD., Tel Aviv (IL)

(72) Inventor: Omri Lavi, Tel Aviv (IL)

(73) Assignee: Monday.com LTD, Tel Aviv (IL)

(*) Notice: Subject to any disclaimer, the term of this patent is extended or adjusted under 35 U.S.C. 154(b) by 0 days.

(21) Appl. No.: 18/171,794

(22) Filed: Feb. 21, 2023

(51) Int. Cl.
*G06F 8/658* (2018.01)
*G06F 16/17* (2019.01)

(52) U.S. Cl.
CPC .......... *G06F 8/658* (2018.02); *G06F 16/1727* (2019.01)

(58) Field of Classification Search
CPC .............................. G06F 8/658; G06F 16/1727
USPC ........................................................ 717/169
See application file for complete search history.

(56) References Cited

U.S. PATENT DOCUMENTS

| | | | |
|---|---|---|---|
| 4,972,314 A | 11/1990 | Getzinger et al. | |
| 5,220,657 A | 6/1993 | Bly et al. | |
| 5,479,602 A | 12/1995 | Baecker et al. | |
| 5,517,663 A | 5/1996 | Kahn | |
| 5,632,009 A | 5/1997 | Rao et al. | |
| 5,682,469 A | 10/1997 | Linnett et al. | |
| 5,696,702 A | 12/1997 | Skinner et al. | |
| 5,726,701 A | 3/1998 | Needham | |
| 5,787,411 A | 7/1998 | Groff et al. | |
| 5,880,742 A | 3/1999 | Rao et al. | |
| 5,933,145 A | 8/1999 | Meek | |
| 6,016,438 A | 1/2000 | Wakayama | |
| 6,016,553 A | 1/2000 | Schneider et al. | |
| 6,023,695 A | 2/2000 | Osborn et al. | |
| 6,034,681 A | 3/2000 | Miller et al. | |
| 6,049,622 A | 4/2000 | Robb et al. | |

(Continued)

FOREIGN PATENT DOCUMENTS

| | | |
|---|---|---|
| CA | 2828011 A1 | 9/2012 |
| CN | 103064833 A | 4/2013 |

(Continued)

OTHER PUBLICATIONS

D'Elessio et al., Monday.com Walkthrough 2018\All Features, Platforms & Thoughts, Mar. 1, 2018, pp. 1-55, 2018.

(Continued)

*Primary Examiner* — Wei Y Zhen
*Assistant Examiner* — Mohammed N Huda
(74) *Attorney, Agent, or Firm* — Finnegan, Henderson, Farabow, Garrett & Dunner LLP

(57) ABSTRACT

Systems, methods, and computer-readable media for constant file replacement operations in a bundle of executable files are disclosed. Systems and methods may involve receiving a plurality of files, reading contents of an impure file in the plurality of files, identifying a link between the impure file and at least one pure file in the plurality of files, and reading contents of the at least one pure file to determine exported values. The at least one pure file may lack side effects. The impure file may be traversed to determine at least one reference to the at least one pure file and ascertaining at least one exported value referenced by the at least one pure file. Systems and methods may involve replacing the at least one reference in the impure file with the ascertained at least one exported value and unlinking the at least one pure file from the impure file.

17 Claims, 7 Drawing Sheets

(56) References Cited

U.S. PATENT DOCUMENTS

| | | |
|---|---|---|
| 6,088,707 A | 7/2000 | Bates et al. |
| 6,108,573 A | 8/2000 | Debbins et al. |
| 6,111,573 A | 8/2000 | McComb et al. |
| 6,167,405 A | 12/2000 | Rosensteel, Jr. et al. |
| 6,169,534 B1 | 1/2001 | Raffel et al. |
| 6,182,127 B1 | 1/2001 | Cronin, III et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin, III et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,988,248 B1 | 1/2006 | Tang et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,489,976 B2 | 2/2009 | Adra |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,916,157 B1 | 3/2011 | Kelley et al. |
| 7,921,360 B1 | 4/2011 | Sundermeyer et al. |
| 7,933,952 B2 | 4/2011 | Parker et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater, Jr. |
| 8,635,520 B2 | 1/2014 | Christiansen et al. |
| 8,677,448 B1 | 3/2014 | Kauffman et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,519,699 B1 | 12/2016 | Kulkarni et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |

(56) References Cited

U.S. PATENT DOCUMENTS

| | | |
|---|---|---|
| 10,564,622 B1 | 2/2020 | Dean et al. |
| 10,573,407 B2 | 2/2020 | Ginsburg |
| 10,579,724 B2 | 3/2020 | Campbell et al. |
| 10,587,714 B1 | 3/2020 | Kulkarni et al. |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,086,894 B1 | 8/2021 | Srivastava et al. |
| 11,222,167 B2 | 1/2022 | Gehrmann et al. |
| 11,243,688 B1 | 2/2022 | Remy et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065848 A1 | 5/2002 | Walker et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1 | 2/2006 | Keyser et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0233647 A1 | 10/2007 | Rawat et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |

(56) References Cited

U.S. PATENT DOCUMENTS

| | | |
|---|---|---|
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | McCormack et al. |
| 2009/0271696 A1 | 10/2009 | Bailor et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225525 A1 | 9/2011 | Chasman et al. |
| 2011/0231273 A1 | 9/2011 | Buchheit |
| 2011/0238716 A1* | 9/2011 | Amir et al. ......... G06F 16/1727 707/823 |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233150 A1 | 9/2012 | Naim et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |

(56) References Cited

U.S. PATENT DOCUMENTS

| | | |
|---|---|---|
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2013/0339051 A1 | 12/2013 | Dobrean |
| 2014/0006326 A1 | 1/2014 | Bazanov |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0082525 A1 | 3/2014 | Kass et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1 | 7/2014 | Grigorovitch et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0188964 A1 | 7/2015 | Sharma et al. |
| 2015/0212717 A1 | 7/2015 | Nair et al. |
| 2015/0220491 A1 | 8/2015 | Cochrane et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | Lore et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0140047 A1 | 5/2017 | Bendig et al. |
| 2017/0140219 A1 | 5/2017 | King et al. |

(56) References Cited

U.S. PATENT DOCUMENTS

| | | |
|---|---|---|
| 2017/0153771 A1 | 6/2017 | Chu |
| 2017/0161246 A1 | 6/2017 | Klima |
| 2017/0177888 A1 | 6/2017 | Arora et al. |
| 2017/0185668 A1 | 6/2017 | Convertino et al. |
| 2017/0200122 A1* | 7/2017 | Edson et al. ............ G06F 16/93 |
| 2017/0206366 A1 | 7/2017 | Fay et al. |
| 2017/0212924 A1 | 7/2017 | Semlani et al. |
| 2017/0220813 A1 | 8/2017 | Mullins et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0301039 A1 | 10/2017 | Dyer et al. |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0324692 A1 | 11/2017 | Zhou |
| 2017/0351252 A1 | 12/2017 | Kleifges et al. |
| 2017/0372442 A1 | 12/2017 | Mejias |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0039651 A1* | 2/2018 | Tobin et al. ........ G06F 16/1727 |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0012342 A1 | 1/2019 | Cohn |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0123924 A1 | 4/2019 | Embiricos et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0179501 A1 | 6/2019 | Seeley et al. |
| 2019/0208058 A1 | 7/2019 | Dvorkin et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0192785 A1 | 6/2020 | Chen |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0014136 A1 | 1/2021 | Rath |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0150489 A1 | 5/2021 | Haramati et al. |
| 2021/0165782 A1 | 6/2021 | Deshpande et al. |

(56) References Cited

U.S. PATENT DOCUMENTS

| | | |
|---|---|---|
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0264220 A1 | 8/2021 | Wei et al. |
| 2021/0326519 A1 | 10/2021 | Lin et al. |
| 2022/0221591 A1 | 7/2022 | Smith et al. |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 112929172 A | 6/2021 |
| EP | 3443466 B1 | 12/2021 |
| KR | 20150100760 | 9/2015 |
| WO | WO 2004100015 A2 | 11/2004 |
| WO | WO 2006116580 A2 | 11/2006 |
| WO | WO 2008109541 A1 | 9/2008 |
| WO | WO 2017202159 A1 | 11/2017 |
| WO | WO 2020187408 A1 | 9/2020 |
| WO | WO 2021096944 A1 | 5/2021 |
| WO | WO 2021144656 A1 | 7/2021 |
| WO | WO 2021161104 A1 | 8/2021 |
| WO | WO 2021220058 A1 | 11/2021 |

OTHER PUBLICATIONS

Rordigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report in PCT/IB2020/000974, dated May 3, 2021 (19 pages).

International Search Report in PCT/IB2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/IB2020/000024, dated May 3, 2021 (13 pages).

"Pivot table—Wikipedia"; URL: https://en.wikepedia .org/w/index.php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2020, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

International Search Report and Written Opinion of the International Search Authority in PCT/IB2021/000297, dated Oct. 12, 2021 (20 pages).

Dapulse.com "features".extracted from web.archive.or/web/2014091818421/https://dapulse.com/features; Sep. 2014 (Year: 2014).

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018.

Pedersen et al., "Tivoli: an electronic whiteboard for informal workgroup meetings", Conference on Human Factors in Computing Systems: Proceedings of the INTERACT '93 and CHI '93 conference on Human factors in computing systems; Apr. 24-29, 1993:391-398. (Year 1993).

Kollmann, Franz, "Realizing Fine-Granular Read and Write Rights on Tree Structured Documents." in The Second International Conference on Availability, Reliability and Security (ARES'07), pp. 517-523. IEEE, 2007. (Year: 2007).

Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).

Peltier, "Clustered and Stacked Column and Bar Charts", Aug. 2011, Peltier Technical Services, Inc., pp. 1-128; (Year: 2011).

Beate List, "An Evaluation of Conceptual Business Process Modelling Languages", 2006, SAC'06, April 23-27, pp. 1532-1539 (Year: 2006).

"Demonstracion en espanol de Monday.com", published Feb. 20, 2019. https://www.youtube.com/watch?v=z0qydTgofIA (Year: 2019).

Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).

Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).

Gutwin, C. et al., "Supporting Informal Collaboration in Shared-Workspace Groupware", J. Univers. Comput. Sci., 14(9), 1411-1434 (2008).

Barai, S., et al., "Image Annotation System Using Visual and Textual Features", In: Proceedings of the 16th International Conference on Distributed Multi-media Systems, pp. 289-296 (2010).

B. Ionescu, C. Gadea, B. Solomon, M. Trifan, D. Ionescu and V. Stoicu-Tivadar, "Achat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).

Susanne Hupfer, Li-Te Cheng, Steven Ross, and John Patterson. 2004. Introducing collaboration into an application development environment. In Proceedings of the 2004 ACM conference on Computer supported cooperative work (CSCW '04). Association for Computing Machinery, New York, NY, USA, 21-24 (Year: 2004).

\* cited by examiner

DIGITAL PROCESSING SYSTEMS AND METHODS FOR REDUCING FILE BUNDLE SIZES

TECHNICAL FIELD

The present disclosure relates to systems and methods for performing constant file replacement operations in a bundle of executable files. For example, disclosed embodiments may be configured to perform constant file replacement operations to reduce the size of a bundle of executable files.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

In some computer systems involving user accounts, onboarding a new user often involves executing a bundle of files. In many situations, the bundles may include constant files that do not affect the software program results when executed. However, executing these constant files when executing the bundle of files can slow computer performance and reduce the efficiency of the computer processing involved in onboarding.

Traditional systems may employ a technique called "Tree Shaking," which may involve the removal of "dead-code." Dead-code may include lines of code, code modules, or other portions of code that do not affect the results of an associated program. However, many traditional systems use code modules that export large objects built from constants, such that parts of the objects cannot be removed without removing the entire object. In such systems, Tree Shaking is ineffective. Systems and techniques for reducing file bundle size to improve computer processing efficiency in processes such as user onboarding are desirable.

SUMMARY

Embodiments consistent with the present disclosure include systems and methods for performing constant file replacement operations in a bundle of executable files. The disclosed embodiments may transform constant files into inlined values (sometimes referred to as inlining references to constant files). As a result, large portions of computer modules may not need to be imported, and large constant files in a software build can be avoided. Embodiments of the present disclosure may overcome one or more aspects of existing techniques for operating modern enterprises.

Consistent with disclosed embodiments, systems, methods, and computer readable media for performing constant file replacement operations in a bundle of executable files are disclosed. The embodiments may include at least one processor. The at least one processor may be configured to receive a plurality of files. The at least one processor may read contents of an impure file in the plurality of files. In some embodiments, the at least one processor may identify a link between the impure file and at least one pure file in the plurality of files. The at least one processor may read contents of the at least one pure file to determine exported values. Furthermore, in some embodiments, the at least one processor may traverse the impure file to determine at least one reference to the at least one pure file. The at least one processor may ascertain at least one exported value referenced by the impure file. In some embodiments, the at least one processor may replace the at least one reference in the impure file with the ascertained at least one exported value. Furthermore, the at least one processor may unlink the at least one pure file from the impure file.

DETAILED DESCRIPTION

Figure 1:
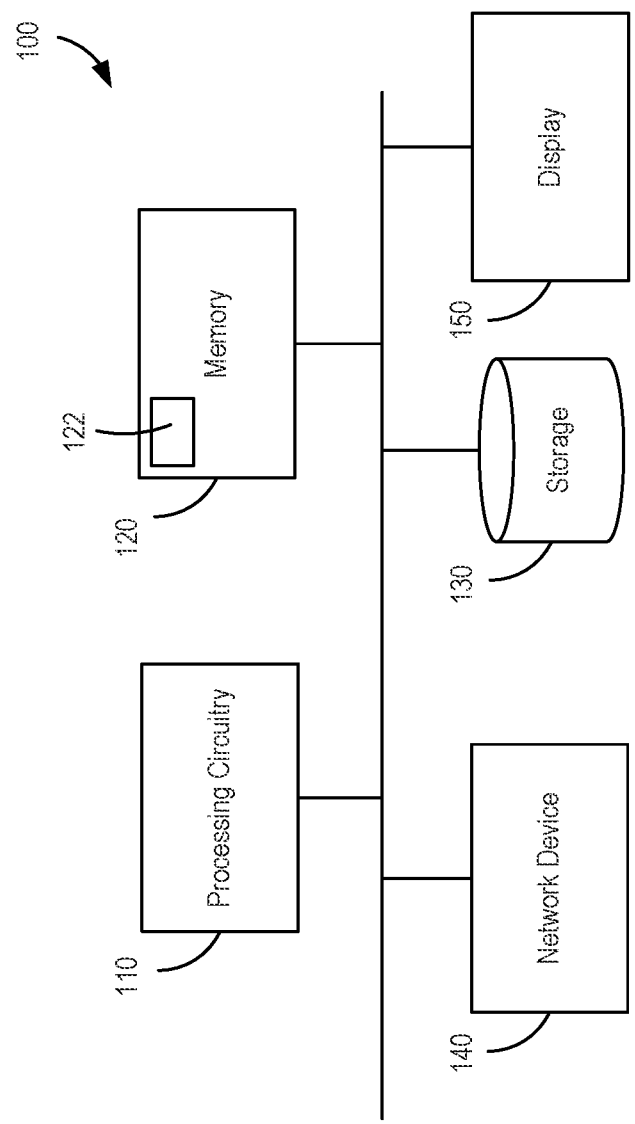
FIG. 1 is a block diagram of an exemplary computing device which may be employed in connection with embodiments of the present disclosure.

The disclosed embodiments address drawbacks in traditional systems by performing constant file replacement operations in a bundle of executable files. In the context of the disclosed embodiments, file replacement may refer to the substitution or removal of files from a bundle of files. This may include the inlining of any reference to primitive data types from other files. The file replacement may allow for the reduction in the number of files that a system or processor may need to download or execute, and may result in a reduction of processing power required and an increase in processing efficiency.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality apply equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit.

Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for performing constant file replacement in a bundle of executable files, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for performing constant file replacement in a bundle of executable files, consistent with disclosed embodiments. In some embodiments, computing device 100 may be similar in type and function to user device 220, discussed with respect to FIG. 2. As shown in FIG. 1, the computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 100 may include one or more input and output devices (not shown in figure). Computing device 100 may also include a display 150, such as a touchscreen display or other display types discussed herein.

Figure 2:
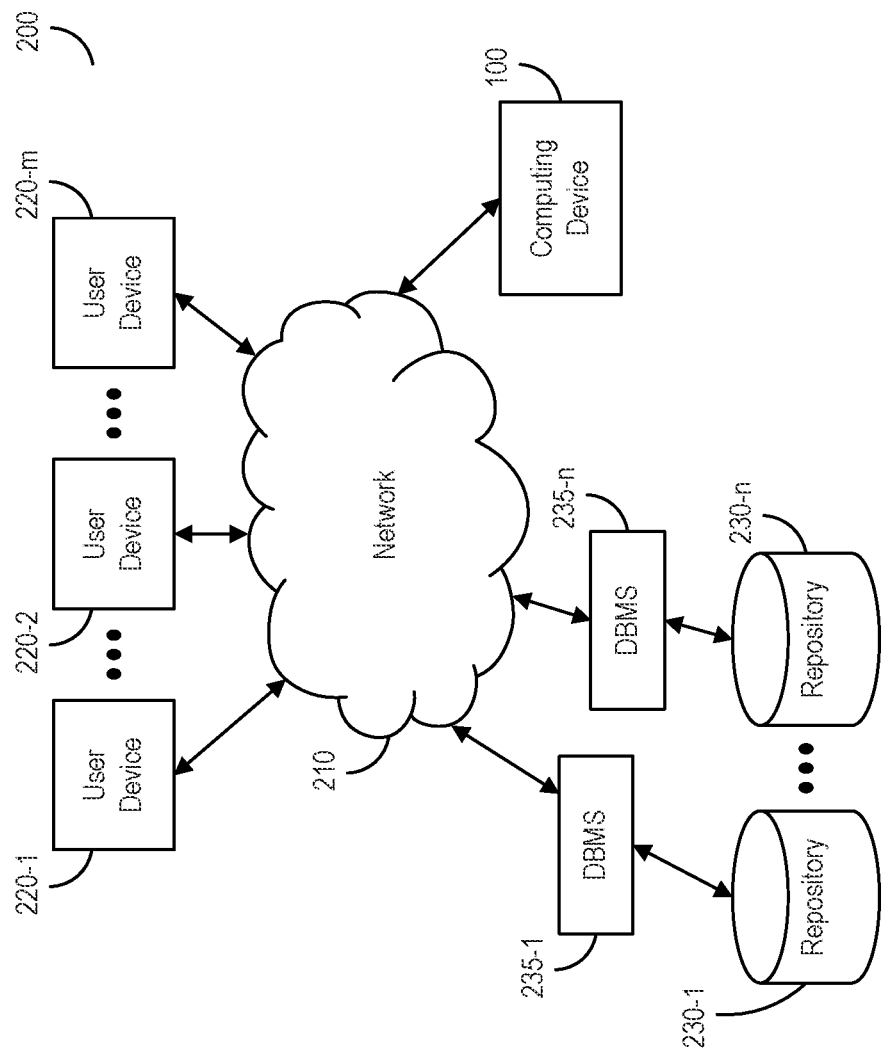
FIG. 2 is a block diagram of an exemplary computing architecture in connection with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-$m$, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-$n$, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-$n$. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Disclosed embodiments may involve performing constant file replacement operations in a bundle of files. A bundle of files, as used herein, may refer to a plurality of associated files that are grouped together. In some embodiments, a bundle may refer to a group of files that contain references to one or more files within the group of files. The operations may be performed on one or more files to reduce the weight or size of the bundle of files. Reducing the weight or size of the bundle of files may include reducing the amount of storage the bundle of files occupy, or reducing the amount of processing power required to run, or execute, the bundle of files. As used herein, the term file may refer to a complete, named collection of information, such as a program, a set of data used by a program, or a user-created document. Additionally, or alternatively, a file may refer to a software file, a software module, a code module, a program file, or any other document containing code or scripting language.

Furthermore, as used herein, file replacement may refer to the substitution or removal of files from, for example, a bundle of files. In some embodiments, file replacement may refer to the substitution or removal of references to files and in some cases, the subsequent substitution or removal of the files themselves. For example, in some embodiments, file replacement may include the promotion of inlining of any reference to predetermined data types from one or more files. In some embodiments, the system may inline simple constants that are used in a scripting or coding language, such as JavaScript. Additionally, or alternatively, in some embodiments, the system may inline complicated constants, or variables, that are used in a scripting or coding language. Simple constants may include simple numerical values (e.g., whole numbers, decimals, fractions, negative numbers, positive numbers) or include simple mathematical calculations (e.g., addition, subtraction, multiplication, division). Complicated constants may include complex numerical values (e.g., logarithmic values, recurring decimals, imaginary numbers, scientific notation) or complex mathematical calculations (e.g., logarithm, exponent, trigonometric functions).

Furthermore, in some embodiments, the predetermined data types may include primitive data types, which may include "byte," "short," "int," "long," "float," "double," "boolean," and "char." As an example, a "byte" may indicate a data type that is an 8-bit signed two's complement integer. Thus, data categorized as a "byte" data type may be an 8-bit binary integer, such as, for example, "00100111."

Inlining may include replacing a reference to an exported value from one or more files, where the one or more files may contain or define the exported value. For example, a bundle may include a first file and a second file. In the second file, a variable, such as "var" or "example" may be created (or declared) of the byte data type and the variable may be defined as, assigned the value, or store the value "00100111,". such that "byte example=00100111," where byte designates the data type. The second file may be imported into, or read by, the first file via, for example, an import or a read statement. The variable may be referenced in the first file simply as "example," and the value "00100111" may be used in any calculation or other operation when the code or script of the first file dictates the use of "example." Thus, the value of "example" may be an exported value of the second file and may be referenced in the first file. Furthermore, inlining may include replacing the reference in the first file to the variable reference ("example") with the value of "example" that may be declared in the second file ("00100111"). "Example" may be an exported value of the second file and may be referenced in the first file after the second file is imported. It is contemplated that the reference "example," may appear one or more times in the first file. After the inlining previously discussed is performed, such that the reference "example" is replaced by value "00100111" in all instances that "example" appears in the first file, the second file may be removed from the bundle of files. Thus, in some embodiments, the file replacement and "inlining" may allow for the reduction in the number of files that are executed. Additionally, or alternatively, after the inlining is performed, such that reference "example" is replaced by value "00100111" in all instances that "example" appears in the first file, the second file may be replaced with an empty file. The first file may maintain the import or read statement that commences the importing, or reading, of the second file. In this example, the file replacement may allow for the reduction in the code that the at least one processor runs or executes and may contribute to a reduction in the processing power required to run or execute the bundle of files and/or an increase in efficiency of the at least one processor.

Figure 3:
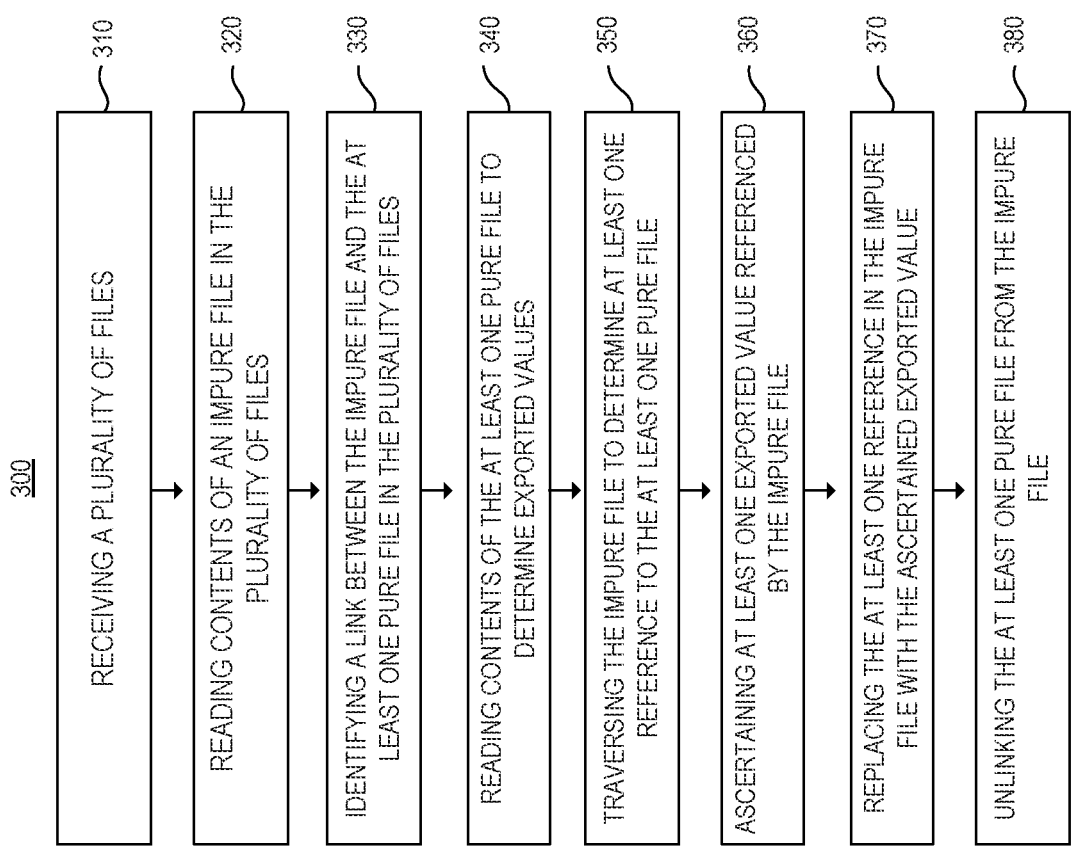
FIG. 3 illustrates a flowchart of an exemplary process for performing constant file replacement operations in a bundle of executable files, consistent with embodiments of the present disclosure.

FIG. 3 is a flowchart of an exemplary process which may be performed in connection with embodiments of the present disclosure. As shown in step 310, disclosed embodiments may receive a plurality of files. The plurality of files may be a bundle of files (as discussed above), a portion of the bundle of files, a module, or any group of files. In some embodiments, a module may include one or more of a collection of files, routines, and data structures that perform a particular task or processes one or more data types. Modules may include, for example, an interface that lists the constants, data types, variables, and routines that can be accessed by other modules or routines and an implementation that contains code or script to implement, execute, or run the routines in the module.

In some embodiments, and as shown in step 320 of FIG. 3, the at least one processor may involve reading contents of an impure file in the plurality of files. An impure file, as used herein, may refer to a file that includes, or has, side effects or references to at least one external source or file. Impure files may be influenced by changes in the referenced at least one external source or file and may be considered dynamic, or not static. Side effects are discussed further below.

As used herein, reading may pertain to examining the contents, metadata, attributes, or other information associated with a file. Thus, reading contents of the impure file may include examining the contents, metadata, attributes, references (e.g., static references, computed references), or other information associated with each file of the plurality of files. Furthermore, in some embodiments, reading contents of the impure file may enable one or more processor to determine one or more files that are imported. For example, the at least one processor may identify a pure file by an extension included in an identifier (e.g., file name) of the pure file. In some embodiments the extension of a pure file may include ".pure.inlined.js", in, for example, an import or read clause. The use of identifiers, such as file names, for inlining may allow for control over different inlining cases. Furthermore, the use of identifiers for inlining may allow for determining parts of code (e.g., code included in a file, such as the impure file) that may break, or cause an error in a code that is executed or running, upon being migrated, moved, run, or executed individually. Thus, in some embodiments, the use of identifiers for inlining may allow for testing and use of embodiments of the present disclosure in various scenarios and test cases. The testing and use of embodiments of the present disclosure in various scenarios and test cases may contribute to the incremental determination of the features and functions that may be supported by embodiments of the present disclosure.

In some embodiments, and as shown in step 330 of FIG. 3, disclosed embodiments may involve identifying a link between the impure file and at least one pure file in the plurality of files. A pure file, as used herein, may refer to a file that does not have any side effects or references to external impure sources or files. Pure files may be static. For example, pure files may be required to not have references to files or sources that are not pure. Thus, the contents of the pure file may be independent of (e.g., does not rely on or is not subject to) changes in external sources or files. As discussed by example previously, embodiments of the present disclosure may include reading contents of a first file in the plurality of files. In some embodiments, the first file may be determined to be pure, the first file may be replaced with an empty file (discussed further below), and the system may begin reading contents of another file. In other embodiments, the first file may be determined to be impure, and the operations discussed further below may be implemented, executed, or carried out.

For example, the impure file may refer to at least one impure file by calling, referencing, or otherwise referring to a variable that is not defined in the impure file but is defined in the at least one pure file. The impure file may be considered to require the at least one pure file to run or execute, as it requires the definition of the called, referenced, or otherwise referred to variable to run or execute (e.g., without errors). Furthermore, in some embodiments, the impure file may import or consume the at least one pure file such that it may read the contents of the at least one pure file and use the value associated with the variable to run or execute. The at least one processor may identify the relationship between the at least one pure file and the impure file as a link, as the at least one pure file and the impure file may be related to or associated with each other based on the called, referenced, or referred to variable and/or based on an import or read statement (e.g., the at least one pure file may be imported into the impure file). In some embodiments, there may be any number of links between the impure file and the at least one pure file. Additionally, or alternatively, the impure file may include links to another file in the plurality of files. Furthermore, the at least one pure file may include links to a more than one file in the plurality of files.

Figure 6:
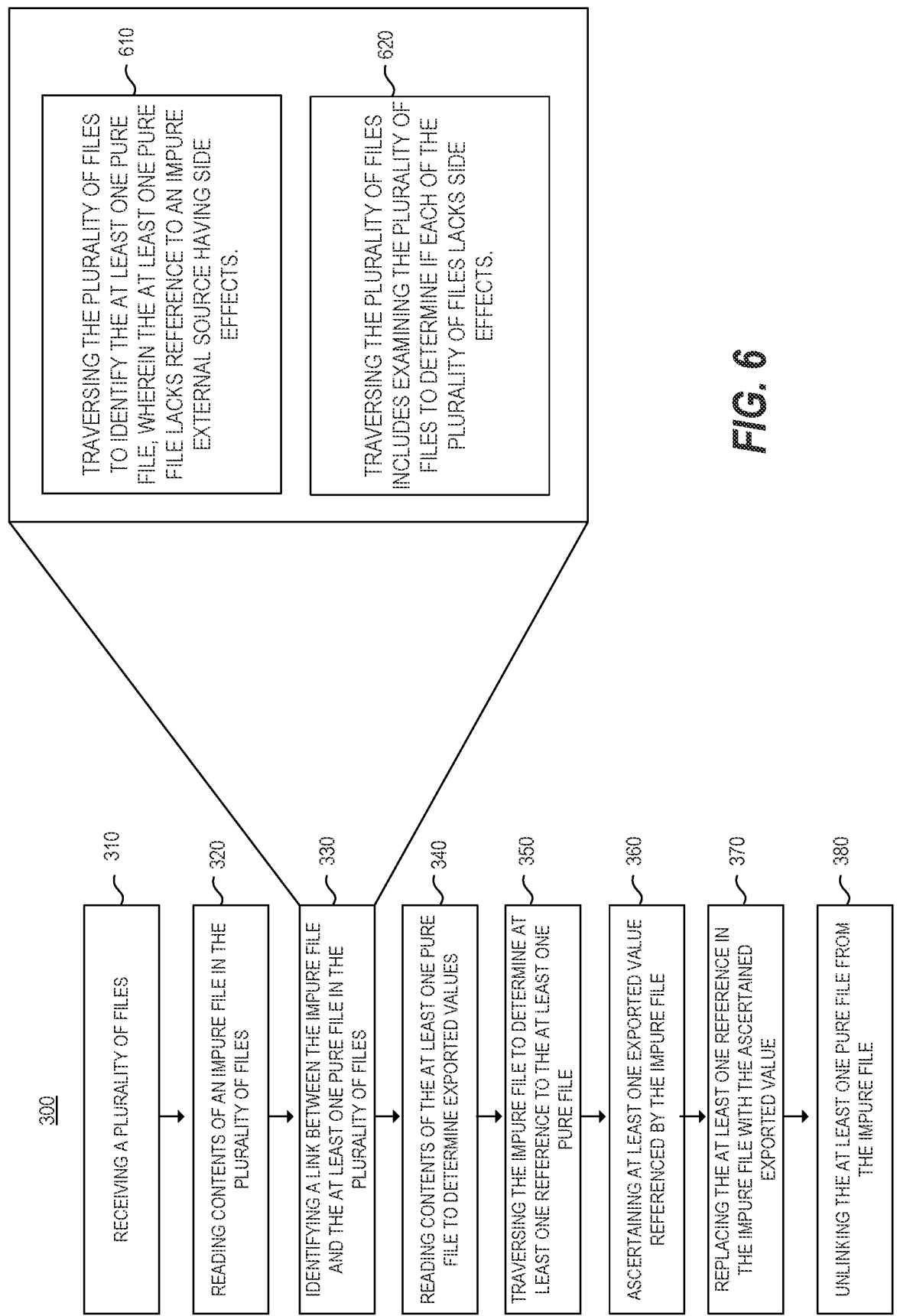
FIG. 6 illustrates a flowchart of an exemplary process for performing constant file replacement operations in a bundle of executable files, including examples of traversing the plurality of files, consistent with embodiments of the present disclosure.

FIG. 6 illustrates a flowchart of an exemplary process for performing constant file replacement operations in a bundle of executable files, including examples of traversing the plurality of files, consistent with embodiments of the present disclosure. In some embodiments, as shown in example 610, disclosed embodiments may include traversing the plurality of files to identify the at least one pure file, and the at least one pure file may lack reference to an impure external source having side effects. An impure external source, as used herein, may pertain to a source (e.g., files, code modules, code documents, script), that is not part of the bundle of files or plurality of files and may contain references to other files. Furthermore, in some embodiments, and as shown in example 620 of FIG. 6, traversing the plurality of files may include examining the plurality of files to determine if each of the plurality of files lacks side effects.

As used herein, side effects may include at least one of a reference to an impure external source, reference to a global variable, or reference to a call function. Thus, in some embodiments, side effects may include a reference to or reliance on an external source or file such that a change in the external source or file may affect a particular file that contains the side effects. A global variable may pertain to a variable that is visible throughout an entire program, file, or bundle of files. A reference to a global variable (or global reference), may be considered a side effect as the global variable may alter a portion of the code or rely on an external resource during the execution of a file. The detecting of global references may occur upon traversing the code and visiting each node of a particular type, such as a referenced identifier. If determined that the referenced identifier has no binding within the scope (e.g., association of the referenced identifier to an entity or variable), then the referenced identifier may be determined to be a global reference. A call function may pertain to one or more sections, modules, lines of code or script that contain an instruction or statement that transfers program execution to another section, module, or lines of code or script, such as a subroutine, to perform a particular task.

As shown in step 340 of FIG. 3, disclosed embodiments may involve reading contents of the at least one pure file to determine exported values. As used herein, exported values may pertain to values (e.g., integer, boolean, strings) stored in a variable in the at least one pure file. For example, and continuing the example above, the exported value may be "00100111" and be stored in the variable "example," such that the second file declares, defines, or states "example=00100111." The variable may be referenced by the first file. For example, the first file may include a reference to the variable such as "abs(example)." In some embodiments, the second file may be a pure file.

It is contemplated that there may be any number of exported values in the at least one pure file. In some embodiments, the at least one pure file may include at least one constant or constant primitive. As used herein, a constant or a constant primitive may refer to an object or variable that does not change or is unchangeable. In some embodiments, a constant or a constant primitive may be a fixed value.

As used herein, a static import may refer to a file, module, variable, or other object that is imported (e.g., making code in one module or file available in another module or file) into, for example, another file. For example, a static import may include a global import of a file, module, variable, or other object into another file. A dynamic import may refer to a file that is imported during the operation of a function. For example, a dynamic import may include a local import of a file, module, variable, or other object into a function in another file. Non-limiting examples of functions may include addition, multiplication, subtraction, logarithmic functions, or other call functions. Thus, in some embodiments, all imports in the at least one pure file may be static due to a high likelihood of unsatisfactory dynamic connections to the at least one pure file.

Figure 5:
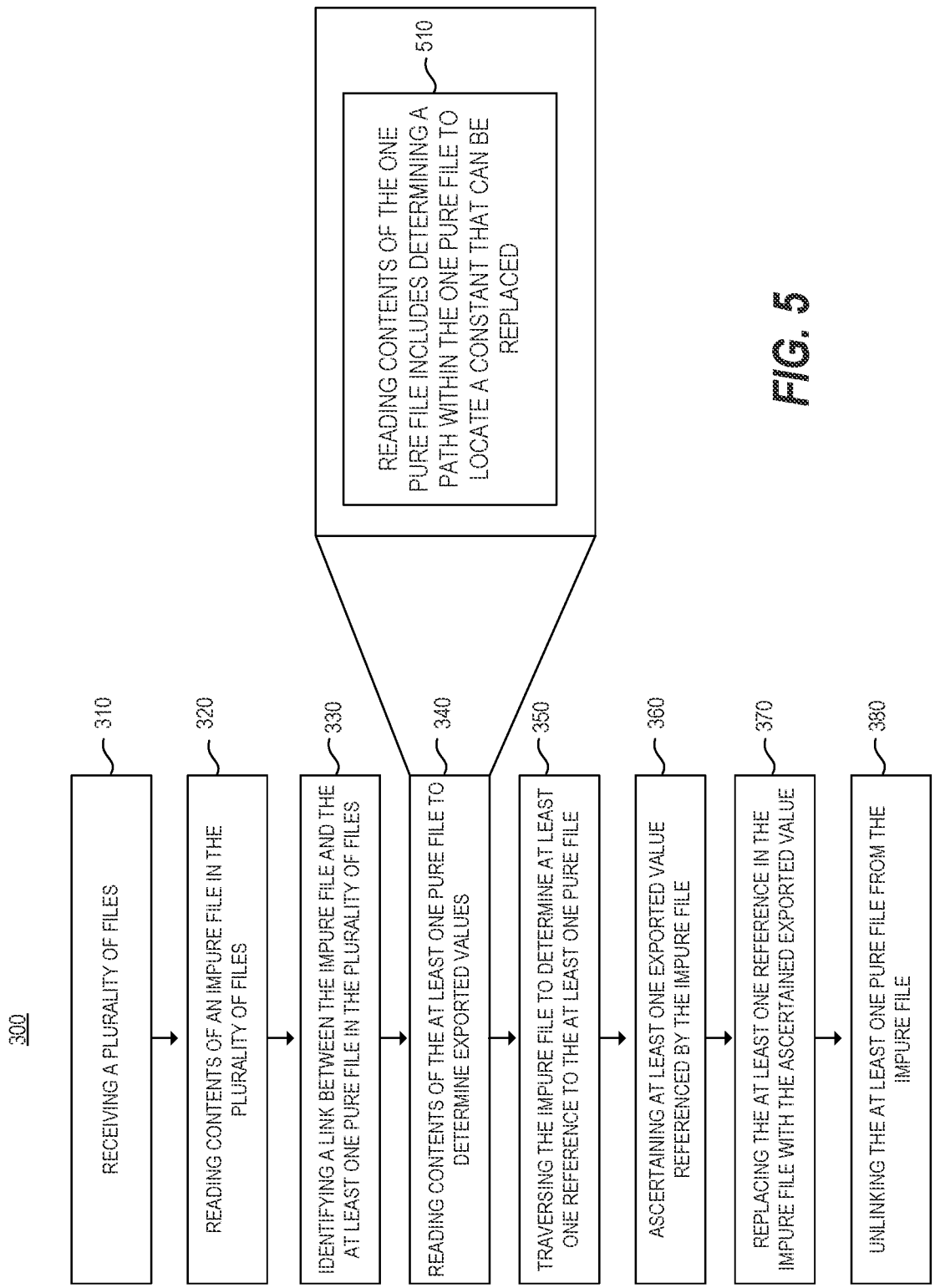
FIG. 5 illustrates a flowchart of an exemplary process for performing constant file replacement operations in a bundle of executable files, including examples of reading contents of at least one pure file, consistent with embodiments of the present disclosure.

FIG. 5 illustrates a flowchart of an exemplary process for performing constant file replacement operations in a bundle of executable files, including examples of reading contents of at least one pure file, consistent with embodiments of the present disclosure. As shown in FIG. 5, the reading of example 340 may include determining a pathway, or path, within the at least one pure file to locate a constant that may be replaced, as shown as step 520. A pathway, or path, may include one or more references to a variable, where the path may originate from the defining of the variable in a pure file and end at the use of the variable in an impure file. Continuing the example of the first and second files above, the second file (which may be a pure file) may contain exported values to replace references in the first file (which may be an impure file). The reference that is replaced may be an import of the second file into the first file or a reference to a variable declared in the second file.

Furthermore, in some embodiments, and as shown in step 350 of FIG. 3, the at least one processor may traverse the impure file to determine at least one reference to the at least one pure file. The traversing may include determining the called, referenced, or referred to variable. For example, and continuing the example above, the at least one processor may traverse the first file to determine that the first file references "example," which is defined in the at least one second file.

As shown in step 360 of FIG. 3, embodiments of the present disclosure may ascertain at least one of the exported values referenced by the impure file. The ascertained at least one of the exported values may include a value stored, assigned, or defined in the at least one referenced variable. Continuing the example above, the ascertaining may include determining that the variable "example" includes the value "00100111," as declared in the second file. It is contemplated that in the first file, there may be any number of references to the second file. Furthermore, the first file may include at least one reference to any number of files. Additionally, or alternatively, the second file may include any number of exported values that are referenced by any number of files.

Figure 7:
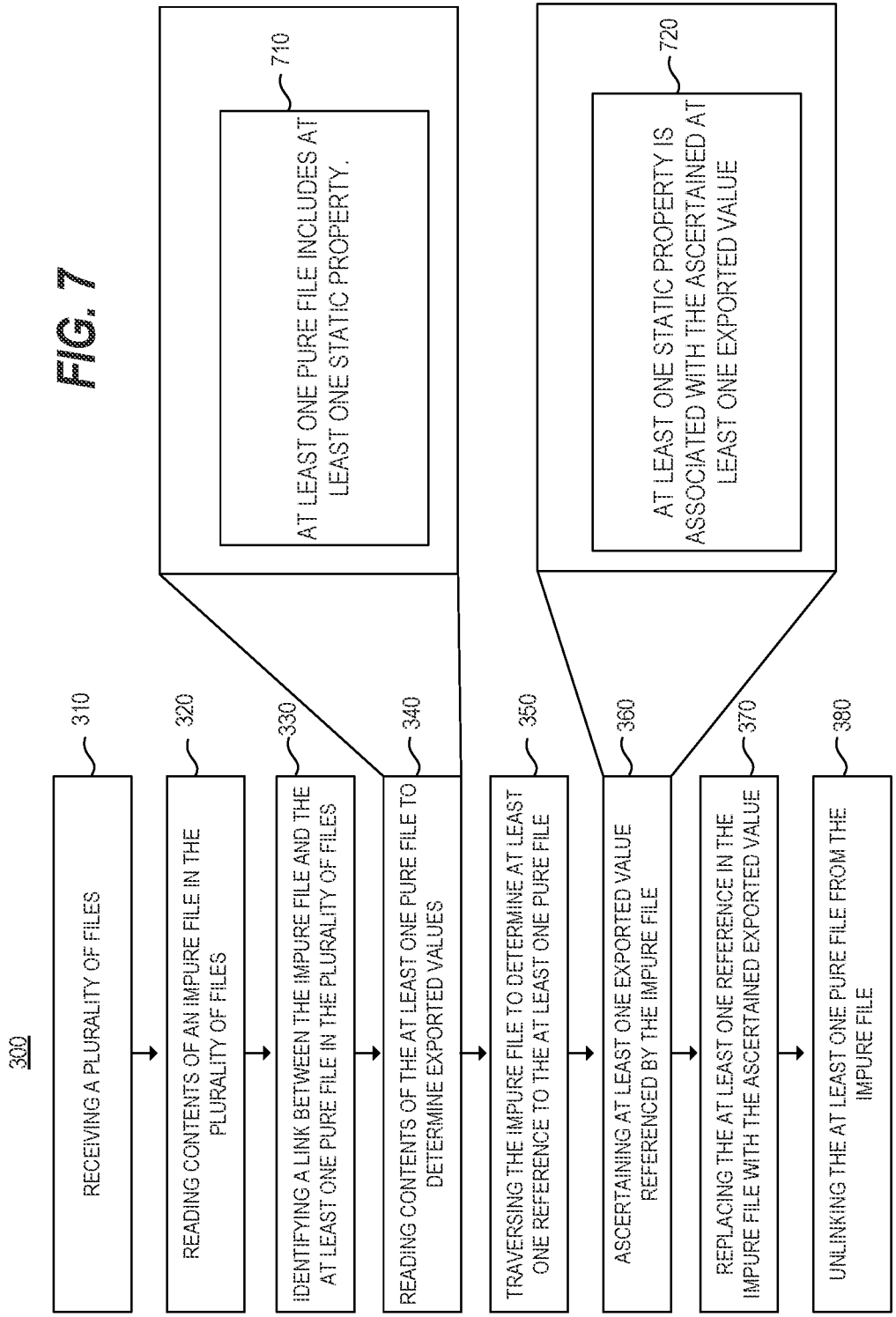
FIG. 7 illustrates a flowchart of an exemplary process for performing constant file replacement operations in a bundle of executable files, including details of the at least one pure file and the at least one exported value, consistent with embodiments of the present disclosure.

As discussed previously, in some embodiments, the at least one pure file may include at least one static property, as shown as example 710 in FIG. 7. The at least one constant or constant primitive may be associated with the ascertained at least one exported value as shown in example 720 of FIG. 7. In some embodiments, the ascertained at least one exported value may be stored in a cache. For example, the ascertained values may be cached such that the at least one pure file is read only once. In some embodiments, the ascertained exported values from the reading of the at least one pure file may be stored in the cache. Additionally, or alternatively, all variables that are defined in the at least one second file (e.g., determined exported values) may be stored in the cache.

Disclosed embodiments may involve replacing the at least one reference in the impure file with the ascertained at least one exported value, as shown in step 370 of FIG. 3. For example, and continuing the example above, the replacing may include substituting the variable "example" in the first file (e.g., impure file) with the exported value "00100111" of the second file (e.g., pure file). Thus, instances of "abs (example)" in the first file may be replaced with "abs (00100111)."

Furthermore, in some embodiments, and as shown in step 380 of FIG. 3, the at least one processor may unlink the at least one pure file from the impure file. For example, the identified relationship between the at least one pure file and the impure file may be removed or rendered obsolete. The unlinking of the at least one pure file and the impure file may allow the at least one pure file to be removed or replaced without affecting the execution of the impure file. Furthermore, the removal or replacement of the at least one pure file after the replacing and the unlinking may reduce the size of the bundle of files without interfering with the execution of the files included in the bundle and the software program.

In some embodiments, the at least one exported value may be a heavy value. As used herein, a heavy value may include a complex number, an exponential number, or any other large or complicated numerical value. The replacing of the at least one reference in the impure file with the heavy value may result in an increase in the size of the files. The replacing and unlinking may be configured to be aborted (or cancelled or stopped) in the presence of an exported heavy value or when the size of the bundle of files increases upon replacing the at least one reference in the impure file with the heavy value. As an example, a long value may require several bytes (e.g., 8 or more bytes) or several thousand characters (such as 10,000 or more characters) to represent the long value. Inlining the long value, especially when inlining in several different places, may result in processor inefficiency, inefficiency of the inlining operation itself, software bugs, or other computational issues. In such scenarios, it may be more efficient to maintain the pure file. Thus, the replacing, unlinking, or inlining may be aborted or cancelled, and the importing of the pure file into the impure file may be maintained.

Figure 4:
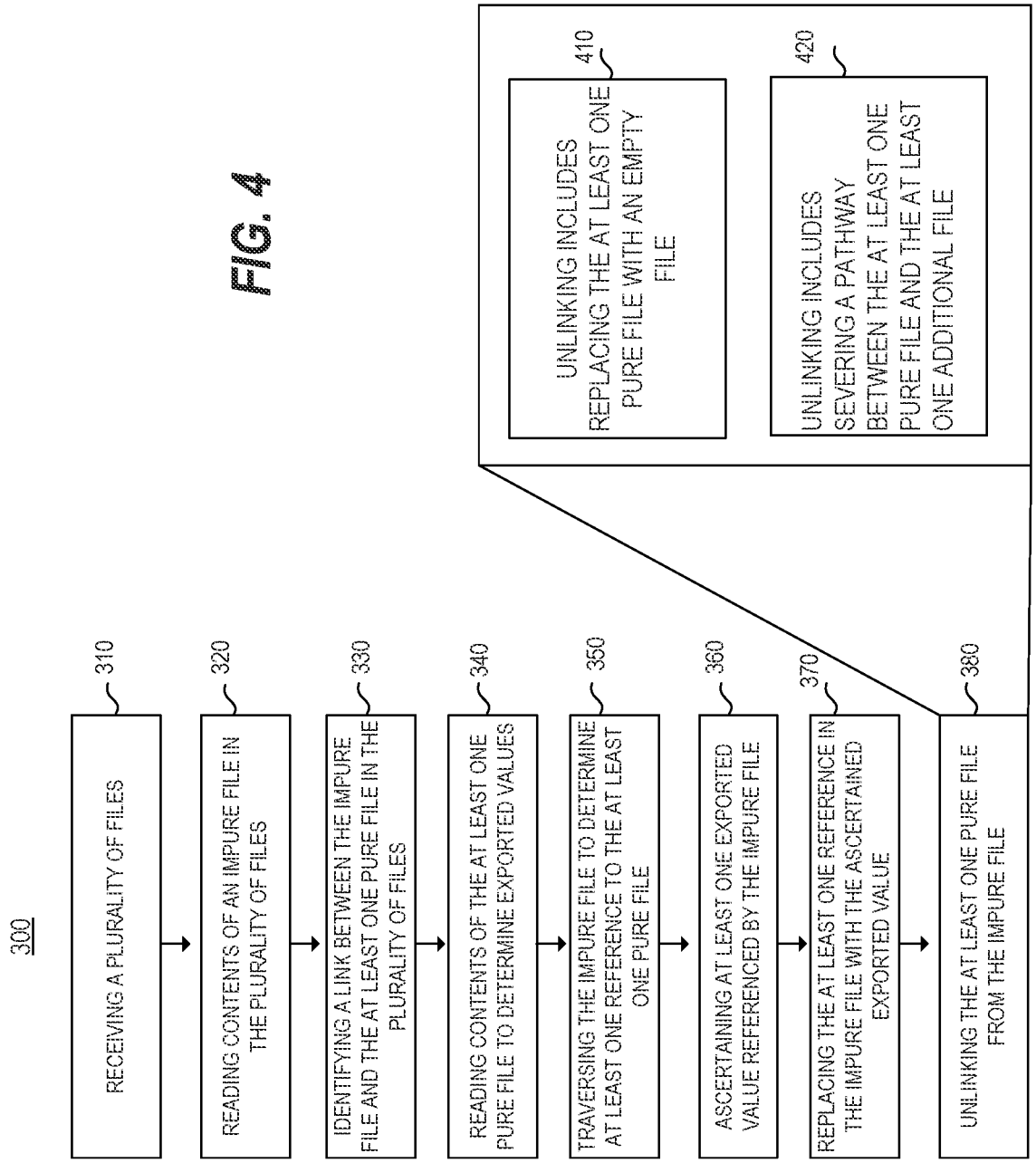
FIG. 4 illustrates a flowchart of an exemplary process for performing constant file replacement operations in a bundle of executable files, including examples of unlinking, consistent with embodiments of the present disclosure.

FIG. 4 illustrates a flowchart of an exemplary process for performing constant file replacement operations in a bundle of executable files, including examples of unlinking, consistent with embodiments of the present disclosure. As shown in FIG. 4, the unlinking of step 380 may include replacing the at least one pure file with an empty file, as shown in example 410. In some embodiments, the contents of the at least on pure file may be omitted. Furthermore, in some embodiments, the at least one pure file and the at least one empty file may have the same file identifier (e.g., name, handle, identification number). As used herein, an empty file may include a file or document that does not have (executable) code or script.

Furthermore, in some embodiments, and as shown in example 420, the unlinking may include severing a pathway, or a path, between the at least one pure file and the impure file. As used herein, the severing of a pathway may include one or more of blocking imports, deleting an import statement, and deleting a require statement in a way of achieving a specified result or course of action. Furthermore, in some embodiments, the at least one pure file may be validated before the unlinking is performed. For example, the at least one pure file may be validated to ensure that it is indeed a pure file. By doing so, the pure file may be checked to ensure that replacing it with an empty file will not impact the execution of other files in the plurality of files.

Furthermore, in some embodiments, the instructions of the non-transitory readable medium, the method, or the instructions executed by the at least one processor of the system may be embodied in a software plug-in module. As used herein, a software plug-in module may be a computer software or computer software program that adds new functions to a host software program (e.g., instructions, software, code, script) without altering the host software program itself. For example, the instructions of the non-transitory readable medium, the method, or the instructions executed by the at least one processor of the system may be embodied in a code or script module that may be added to an existing code or script. The code or script module may be configured to be executed and perform the operations or steps of the method and processes discussed above.

By using the software plug-in, and by inlining the referenced values, an optimization that surpasses tree shaking may be achieved, where tree shaking is a process used by traditional systems and methods. Tree shaking may refer to the removal of dead code within a code module, software module, or script. Tree shaking relies on the import and export statements to detect if code modules are exported and being used between files. Tree shaking may be inefficient at removing unused values, as it is not implemented well with internal object properties. For example, a single reference in any entry point of a module bundler, such as webpack, may entail that the entire object will be included in the output of a compilation. This then may allow for other top-level properties to be included, which may create unneeded values in the bundle. In some situations, there may exist thousands of such unneeded files in a bundle. Thus, inlining is desirable. Inlining may allow for the removal of larger objects from the bundle, thus keeping only desired values. The files may be parsed and manipulated using Abstract Syntax Trees (ASTs) to inline the referenced values. Abstract Syntax Trees may include a tree representation of the source code of a script, code module, or software module that conveys the structure of the source code.

In traditional systems, a module bundler, such as webpack, may handle the parsing and manipulating of imports. However, a module bundler is limited in its ability to manipulate the files using ASTs. Thus, a plug-in according to embodiments of the present disclosure may be used. For example, a Babel plug-in in accordance with embodiments of the present disclosure, may be used in conjunction with a babel-loader. A babel-loader may decrease the bundle size of a bundle of executable files by 10% or more. In some embodiments, a primitives inliner plug-in, consistent with embodiments of the present disclosure, may be run before a Babel plug-in, consistent with embodiments of the present disclosure. In some embodiments, other plug-ins may be used to perform transformations on import and require statements in, for example, an impure file that imports or requires a pure file. The plug-in may find references to pure files, detect the referenced keys, compute the keys and replace them with original references. As used herein, variables or values may be referred to as keys. The exported values of pure files may be determined using a "require statement." In some embodiments, the imported or required file may be written in a coding or scripting language different from that of the plug-in. In this case, the "require" statement may be wrapped with a try/catch function and an error generated due to the mismatch of coding or scripting languages may be inspected. In some embodiments, should the error identify that the imported or required file is written in a different coding or scripting language than that of the plug-in, then the imported or required file may be transpiled (e.g., transformed or translated into the language of the plug-in), and the transpiled file may be run to determine exported values.

Additionally, when a module bundler loads a file, it may proceed to check the dependencies of the file based on the transpiled output. This may present a challenge due to the removal of the import files, which may signify that the pure files are not loaded via Babel and thus will not allow for the plugin to validate its content.

A solution for incorporating the plug-in may include allowing the plug-in to accurately detect which pure files are being removed. Before the imports of the files are removed, the plug-in may perform validations on the files. For example, once the plug-in removes the import statement of a file, it may validate the contents of the file to ensure that the file is a pure file and only then remove the import. The validation may be performed with a traversal on the pure files, which may cache the pure files that have already been validated. The caching of the pure files may prevent the same file from being validated multiple times after the file has been imported previously. The validation may ensure that the pure file being referenced in the compilation are indeed pure files to ensure that an error does not occur.

In some embodiments, the plug-in may also require a series of tests. A special test, known as an "Exec Test," may be utilized. An Exec Test may include transpiling numerous test cases of the plug-in and running the plug-in to obtain an output (e.g., reduced bundle size). For example, a pure file and an impure file may be used. A reference to a global variable may be included in the files during the test. The code of the files may be retrieved or wrapped within a function that has an array in its scope, which may be represented as the output. This may result in an array containing all of the strings used in the original code of the files. In some embodiments, the Exec Test may allow for the comparison of the output of a file with and without the inlining by the plug-in and may allow for the comparing of the content of the resultant arrays. Passing the test may include results where the content, or output of a file with and without the inline or plug-in, is identical.

Tests such as Exec Tests may allow for changes to be made within the plug-in and allow for the performance of new test cases. The plug-in may include a module bundler alias which may be needed to resolve paths. If aliases are resolved differently, there may be a risk of the incorrect value being referenced and inlined. When configuring a resolve property of the module bundler, the plug-in may proceed to insert, or inject, an associated property to a new instance of the resolve property. This instance may then be used when a path is needed to be resolved. Due to the insertion, or injecting of, the resolve configurations to the plug-in, the behavior of the plug-in may replicate that of a module bundler. This may allow for the handling of pure files that are imported using aliases.

Furthermore, in some embodiments, the plug-in may introduce a unique requirement as it recompiles the multiple files each time a single file changes. The plug-in may be implemented using a single build. However, the plug-in may be run in "watch mode," where it may rerun of the files upon each change to the files. Using babel-loader, the file may be recompiled each time the file changes. For example, a pure file with the statement "config.inlined.purejs" may be recompiled while in "watch mode" each time the pure file changes. Thus, for example, two separate files may require recompilation because they require a reference and require new content to inline values. This may result in less-than-optimal performance.

In some embodiments, primitive data may be represented directly at the lowest level of the (coding or scripting) language implementation and may be immutable (e.g., cannot essentially be altered). Primitive data may serve the purpose of containing pure values for pure files. In some embodiments, the impure file may import the pure file, and may access object properties of an object, or variable, defined or established within the pure file. Thus, the impure file may reference the object properties of objects, or variables, defined or established within the pure file to use the objects, or variables, in the impure file. Thus, in some embodiments, only static imports may be allowed for pure files and the migration of files may be required to be performed via particular module formatting systems (e.g., CommonJS).

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following features alone or in combination with one or more other features, whether implemented as a method, by at least one processor, and/or stored as executable instructions on non-transitory computer-readable media. Disclosed embodiments may include a system for performing constant file replacement operations in a bundle of executable files. The at least one processor may be configured to execute instructions stored in at least one memory. The instructions may be embodied in a software plug-in module. The system may include at least one processor configured to receive a plurality of files. The at least one processor may read contents of an impure file in the plurality of files. The at least one processor may traverse the plurality of files to identify at least one pure file, and the at least one pure file may lack reference to an impure external source having side effects. Side effects may include at least one reference to an external source, reference to a global variable, or reference to a call function. The traversing the plurality of files may include examining the plurality of files to determine if each of the plurality of files lacks side effects. Furthermore, the at least one processor may identify a link between the impure file and at least one pure file in the plurality of files. The at least one pure file may include at least one static property, and the at least one static property may be associated with an ascertained at least one exported value. The at least one processor may read contents of the at least one pure file to determine exported values. The reading may include determining a path within the at least one pure file to locate a constant that can be replaced. The at least one processor may traverse the impure file to determine at least one reference to the at least one pure file. The at least one processor may ascertain at least one exported value referenced by the impure file. The ascertained at least one exported value is stored in a cache. The at least one processor may replace the at least one reference in the impure file with the ascertained at least one exported value. The at least one processor may unlink the at least one pure file from the impure file, and the unlinking may include replacing the at least one pure file with an empty file. The at least one pure file and the empty file may have a same file identifier. Furthermore, the unlinking may include severing a pathway between the at least one pure file and the impure file. The instructions may be included in a software plug-in module.

Disclosed embodiments may include a system for performing constant file replacement operations in a bundle of executable files. The at least one processor may be configured to execute instructions stored in at least one memory. The at least one processor may receive a plurality of files. The at least one processor may read contents of a first file in the plurality of files and identify a link between the first file and at least one second file in the plurality of files. Furthermore, the at least one processor may read contents of the at least one second file to determine exported values, wherein the at least one second file lacks side effects. The at least one processor may traverse the first file to determine at least one static reference to the at least one second file. The at least one processor may ascertain at least one exported value referenced by the at least one second file. The at least one processor may replace the at least one static reference in the first file with the ascertained at least one exported value. The at least one processor may unlink the at least one second file from the first file.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The above-described embodiments may be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer readable medium containing instructions that when executed by at least one processor cause the at least one processor to perform constant file replacement operations in a bundle of files, the operations comprising:
    receiving a plurality of files;
    traversing the plurality of files to identify at least one pure file, wherein the at least one pure file lacks reference to an impure external source having side effects, and wherein the side effects include at least one of reference to an external source, reference to a global variable, or reference to a call function;
    reading contents of an impure file in the plurality of files;
    identifying a link between the impure file and the at least one pure file in the plurality of files;
    reading contents of the at least one pure file to determine exported values;
    traversing the impure file to determine at least one reference to the at least one pure file;
    ascertaining at least one exported value referenced by the impure file;
    replacing the at least one reference in the impure file with the ascertained at least one exported value; and
    unlinking the at least one pure file from the impure file.

2. The non-transitory computer readable medium of claim 1, wherein the at least one pure file includes at least one constant or constant primitive.

3. The non-transitory computer readable medium of claim 2, wherein the at least one constant or constant primitive is associated with the ascertained at least one exported value.

4. The non-transitory computer readable medium of claim 1, wherein the ascertained at least one exported value is stored in a cache.

5. The non-transitory computer readable medium of claim 1, wherein traversing the plurality of files includes examining the plurality of files to determine if each of the plurality of files lacks side effects.

6. The non-transitory computer readable medium of claim 1, wherein the unlinking includes replacing the at least one pure file with an empty file, wherein the at least one pure file and the empty file have a same file identifier.

7. The non-transitory computer readable medium of claim 1, wherein the unlinking includes severing a pathway between the at least one pure file and the impure file.

8. The non-transitory computer readable medium of claim 1, wherein reading contents of the at least one pure file includes determining a path within the at least one pure file to locate a constant that can be replaced.

9. The non-transitory computer readable medium of claim 1, wherein the instructions are included in a software plug-in module.

10. A method for constant file replacement in a bundle of files, the method comprising:
    receiving a plurality of files;
    traversing the plurality of files to identify at least one pure file, wherein the at least one pure file lacks reference to an impure external source having side effects, and wherein the side effects include at least one of reference to an external source, reference to a global variable, or reference to a call function;
    reading contents of an impure file in the plurality of files;
    identifying a link between the impure file and the at least one pure file in the plurality of files;
    reading contents of the at least one pure file to determine exported values;
    traversing the impure file to determine at least one reference to the at least one pure file;
    ascertaining at least one exported value referenced by the at least one pure file;
    replacing the at least one reference in the impure file with the ascertained at least one exported value; and
    unlinking the at least one pure file from the impure file.

11. The method of claim 10, wherein the at least one pure file includes at least one constant or constant primitive.

12. The method of claim 10, wherein the reading contents of the at least one pure file includes determining a path within the at least one pure file to locate a constant that can be replaced.

13. The method of claim 10, wherein the method is included in a software plug-in module.

14. A computer system for constant file replacement in a bundle of files, the system comprising:
    at least one processor configured to execute instructions stored in at least one memory, to:
        receive a plurality of files;
        traverse the plurality of files to identify at least one pure file, wherein the at least one pure file lacks reference to an impure external source having side effects, and wherein the side effects include at least one of reference to an external source, reference to a global variable, or reference to a call function;
        read contents of an impure file in the plurality of files;
        identify a link between the impure file and the at least one pure file in the plurality of files;
        read contents of the at least one pure file to determine exported values;
        traverse the impure file to determine at least one reference to the at least one pure file;
        ascertain at least one exported value referenced by the at least one pure file;
        replace the at least one reference in the impure file with the ascertained at least one exported value; and
        unlink the at least one pure file from the impure file.

15. The computer system of claim 14, wherein the reading contents of the at least one pure file includes determining a path within the at least one pure file to locate a constant that can be replaced.

16. The computer system of claim 14, wherein the instructions are included in a software plug-in module.

17. A non-transitory computer readable medium containing instructions that when executed by at least one processor cause the at least one processor to perform constant file replacement operations in a bundle of files, the operations comprising:
    receiving a plurality of files;
    reading contents of a first file in the plurality of files;
    traversing the plurality of files to identify at least one second file, wherein the at least one second file lacks reference to an impure external source having side effects, and wherein the side effects include at least one of reference to an external source, reference to a global variable, or reference to a call function;

identifying a link between the first file and the at least one second file in the plurality of files;

reading contents of the at least one second file to determine exported values;

traversing the first file to determine at least one static reference to the at least one second file;

ascertaining at least one exported value referenced by the at least one second file;

replacing the at least one static reference in the first file with the ascertained at least one exported value; and unlinking the at least one second file from the first file.

* * * * *